G. SOMMERS.
VEHICLE WHEEL.
APPLICATION FILED SEPT. 11, 1907.
No. 900,891. Patented Oct. 13, 1908.
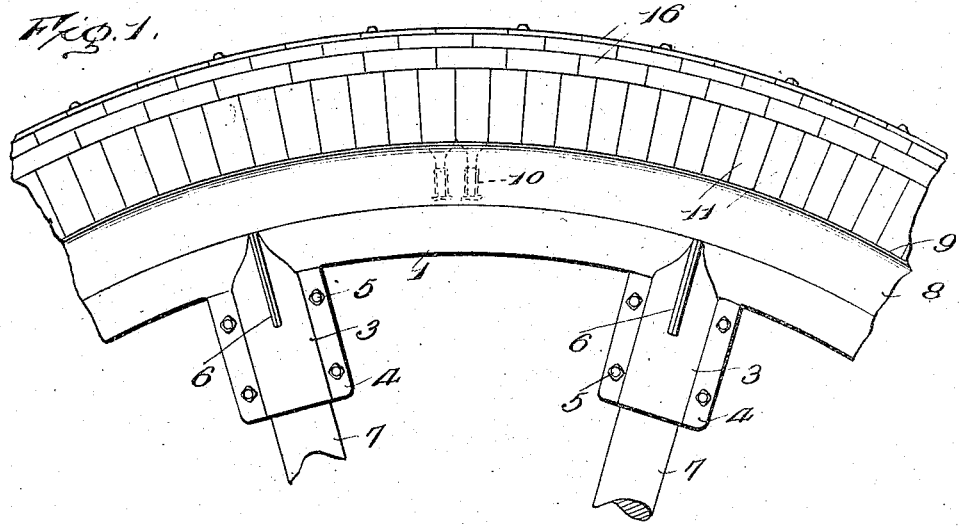
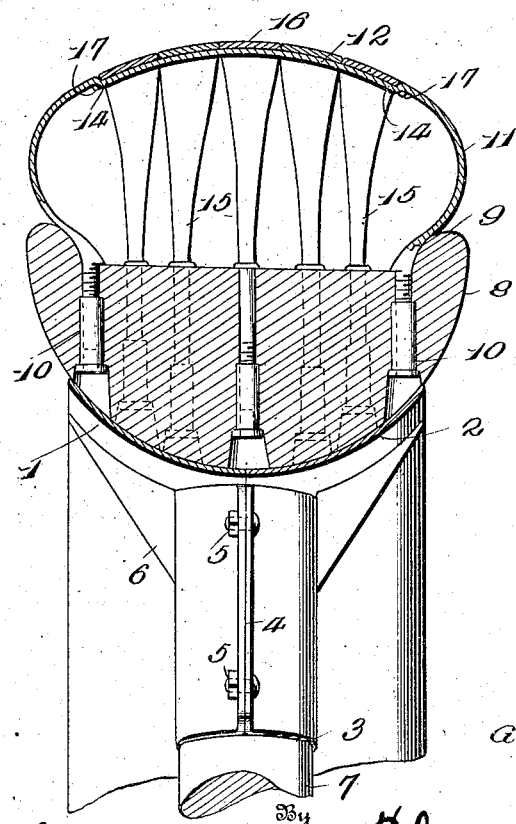
Inventor
George Sommers

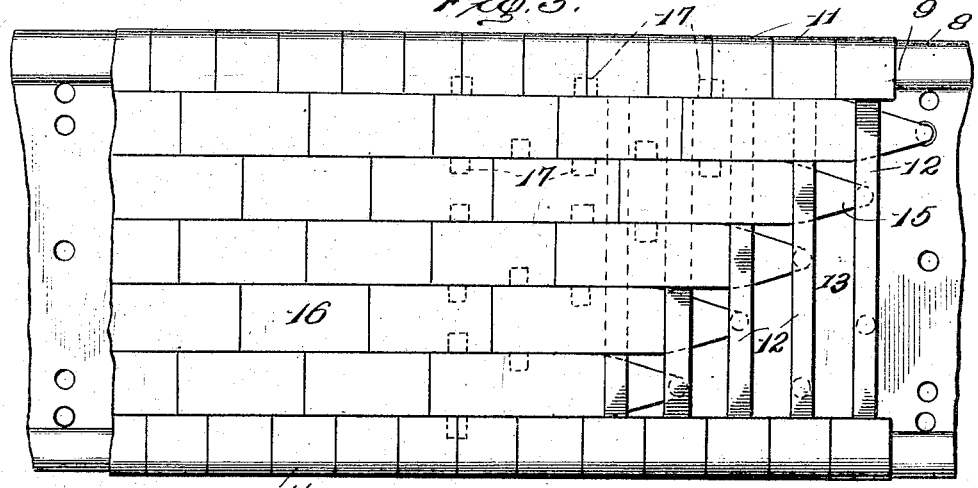

UNITED STATES PATENT OFFICE.

GEORGE SOMMERS, OF MINNEAPOLIS, MINNESOTA.

VEHICLE-WHEEL.

No. 900,891.  Specification of Letters Patent.  Patented Oct. 13, 1908.

Application filed September 11, 1907. Serial No. 392,326.

To all whom it may concern:

Be it known that I, GEORGE SOMMERS, citizen of the United States, residing at Minneapolis, in the county of Hennepin and State of Minnesota, have invented certain new and useful Improvements in Vehicle-Wheels, of which the following is a specification.

This invention appertains to yieldable tires or rims for vehicle wheels, the purpose being to provide a tire structure of that character which will practically embody the essential features of a pneumatic tire, but yet be free from the objection of collapsing in the event of a puncture or cut, which causes deflation of pneumatic tires and necessitates their replacement.

The present invention provides, essentially, an all metal tire of such formation as to prevent the entrance of mud or foreign matter into the space inclosed by the elements comprising the tire.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a portion of the vehicle wheel embodying the invention. Fig. 2 is a transverse section of the rim portion of the wheel. Fig. 3 is a plan view of a portion of the tire showing the arrangement of the yieldable elements. Fig. 4 is a detail perspective view of a portion of the rim and tire. Fig. 5 is a longitudinal section of a portion of the rim and tire. Fig. 6 is a perspective view of a longitudinal tire element.

Corresponding and like parts are referred to in the following description and indicated in all the views of the drawings by the same reference characters.

The tire comprises a tread portion, which is yieldable, and a supporting rim, the latter being of any suitable material, wood being preferred. The rim of the wheel to which the tire is fitted is channeled or made hollow in its outer circumference and is of sectional formation comprising similar parts or sections 1 and 2 which are fitted together and bolted or otherwise secured. Spoke sockets 3 are provided at intervals in the circumferential length of the rim and are provided at opposite sides with flanges 4 transversely apertured to receive bolts or fastenings 5. Webs 6, interposed between the side members of the sockets and the respective rim sections, brace said parts, as indicated most clearly in Fig. 2. The spokes 7 are fitted into the sockets and held fast by clamping the members of said sockets thereon. The tire proper consists of a supporting rim 8 and resilient elements forming the yielding tread. The rim 8 is preferably of wood and is channeled in its outer circumference, although this is not essential, but is preferred as the side flanges 9 form lateral supports for the transverse or arched members. The rim 8 is provided with a plurality of openings in which the inner ends of the resilient or spring elements are secured, said openings preferably extending through the rim and enlarged at their inner ends to receive the nuts 10 by means of which the spring elements are held in place. The spring elements are provided in two series, one extending crosswise of the tire and the other parallel, or in the circumferential length thereof. The cross elements 11 are of arched form and have their attaching ends made round and threaded to receive the ends 10 by means of which they are secured to the rim 8. The middle portion of the arched members 11 is reduced in width, as indicated at 12, to provide spaces 13 to receive the circumferential spring members. The narrow portions 12 are off-set at their ends, as indicated at 14, a distance corresponding approximately to the thickness of the outer or tread portions of the circumferential spring members, so that in transverse section the tire may present an unbroken outline on its outer surface. The arched members 11 have their side portions touching at their longitudinal edges so as to form a practically tight inclosure to exclude mud and other foreign matter.

The circumferential spring elements 15 are of elbow form and have one member made stout and secured to the rim 8 and the other member 16 made thin and wide and constituting the tread portion. The attaching ends of the members 15, like those of the arched members 11, are threaded to receive nuts 10 and are shouldered to engage with the outer surface of the rim so as to clamp the latter between the shouldered portions and the securing nuts. The elements 15 are arranged in parallel circles above the rim 8, with their outer tread portions 16 overlapping, whereby one braces the other. The elements 15 have a progressive arrangement, that is, the elements of one circle are set a little in advance of corresponding elements of the adjacent circle, this arrangement resulting in breaking joints. The longitudinal edge portions of the parts 16 touch so as to completely close the space and prevent mud or foreign matter passing by them to the interior of the tire. The progressive or echelon arrangement of the circumferential elements 15, besides resulting in the formation of break joints, distributes the strain to better advantage to enable the tire to sustain a heavy load or strain, as when traveling over rough roads. Lugs 17 project from opposite sides of the elements 15 near the extremities of the tread portion 16 and are adapted to underlap adjacent elements so as to prevent outward springing of the free ends of the elements and insure a comparatively smooth exterior surface to the tire. The spring elements 15 forming the outermost circumferential rings, are arranged so that the outer lugs 17 underlap the joints formed between the adjacent cross or arched members, thereby assisting materially in holding the same in alinement. The outer lugs of the elements bordering upon the widened side portions of the arched members 11, underlap said widened portions at the ends of the narrow portions 12, thereby holding the adjacent portions of the elements in alinement and preventing one springing outward farther than the other. When the several circumferential and cross members forming the yieldable portion of the tire are properly positioned, the outer surface formed is continuous and the overlapping and interlocking of the parts insure the alinement and the maintenance of the parts in proper relationship. It will be also understood that by reason of the peculiar arrangement, the load is equalized and distributed over a comparatively great extent of surface, thereby enabling the tire to be perfectly resilient so as to absorb shock and vibration and produce the ease and comfort attributable to pneumatic tires.

Having thus described the invention, what is claimed as new is:

1. A yieldable tire comprising cross elements of arched form, and circumferential elements of approximately elbow form and having their outer or tread portions passed between cross members and overlapping the same.

2. A yieldable tire comprising cross members having side portions touching at their longitudinal edges and having their middle portions made narrow to form spaces, and circumferential spring members filling the space transversely between the widened side portions of the cross members and overlapping the narrow middle portions thereof.

3. A yieldable tire comprising cross members, having their middle portions spaced apart and depressed, and circumferential spring elements of approximately elbow form having their tread portions passed between the spaced portions of the cross members and overlapping the same and having their outer surface in line with the outer surface of the widened parts of said cross elements.

4. A yieldable tire comprising cross members having their side portions touching their middle portions made narrow and spaced apart, a circular series of spring elements having their tread portions overlapping the narrow portions of the cross members, and lugs projected from the tread portions of said circumferential members to underlap portions of the adjacent members and the joints formed between the widened portions of the cross members.

5. A yieldable tire comprising a rim, spring cross members secured to said rim and having the longitudinal edges of their side portions touching and their middle portions made narrow and spaced apart and depressed, and a circular series of circumferential spring members of approximately elbow form having their tread portions overlapped and overlapping the middle spaced portions of the aforesaid cross members, and having lateral lugs to underlap adjacent portions of the respective spring elements.

In testimony whereof I affix my signature in presence of two witnesses.

GEORGE SOMMERS. [L. S.]

Witnesses:
 GEORGE GRANT,
 W. K. HICKS.